May 22, 1956     W. E. SIMMONS     2,746,633

EYELET FORMING METHOD AND APPARATUS

Filed Aug. 25, 1952

INVENTOR.
WILLIAM EARL SIMMONS
BY Marvin Moody
ATTORNEY

United States Patent Office 2,746,633
Patented May 22, 1956

2,746,633

EYELET FORMING METHOD AND APPARATUS

William Earl Simmons, Cedar Rapids, Iowa, assignor to Collins Radio Company, Cedar Rapids, Iowa, a corporation of Iowa Application August 25, 1952, Serial No. 306,119

3 Claims. (Cl. 218—14)

This invention relates in general to means for inserting eyelets in a workpiece and in particular to apparatus for reducing breakage.

It is oftentimes desirable in fabrication processes to insert an eyelet through a workpiece. If the workpiece is brittle, a relatively high percentage of breakage occurs when the eyelet is seated, and this results in high expense.

The present invention relates to an improved method for forming eyelets so as to reduce breakage.

It is an object of this invention to provide an eyelet forming device which allows room for the forming of a head on one side of the eyelet.

Another object of this invention is to provide an improved eyelet forming machine.

Figure 1:
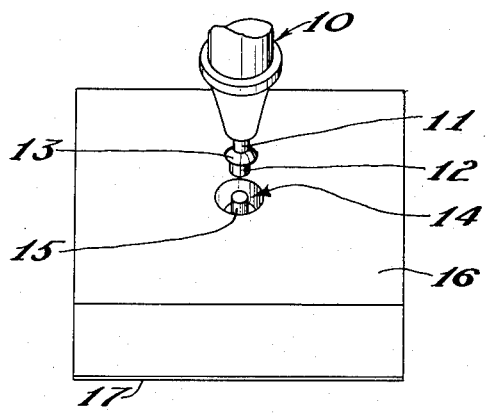
Figure 2:
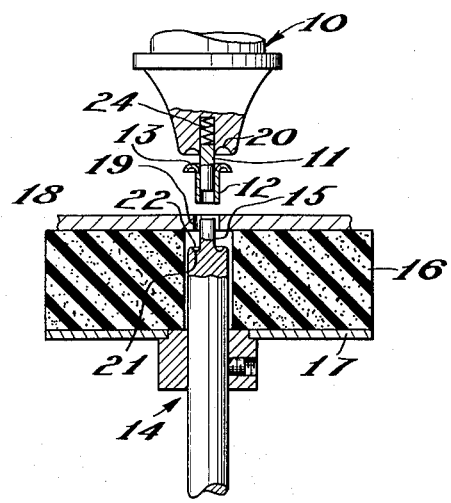
Figure 3:
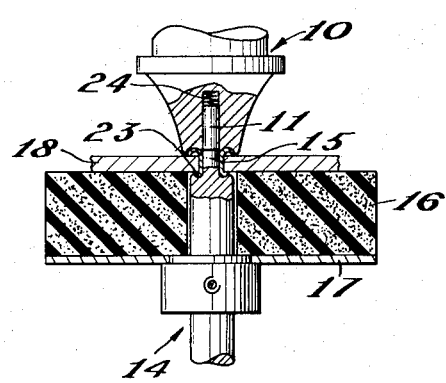

Further objects, features and advantages of the invention will become apparent from the following description and claims when read in view of the drawings, in which:

Figure 1 is a perspective view showing the eyelet forming device of this invention, Figure 2 is a sectional view showing the eyelet forming apparatus of this invention in the up position, and Figure 3 is a sectional view showing the eyelet forming device in the down position with the eyelet formed.

Prior to my invention, excessive breakage has occurred when inserting eyelets into breakable materials and this has been caused primarily by accordion-like folds which form in the walls of the eyelet as it is pressed downwardly on the base tool.

My apparatus substantially eliminates breakage by allowing more initial clearance of the shank of the eyelet through the breakable materials between the upper tool and lower base tool than is done in the conventional apparatus, so that the eyelet head is seated against the workpiece before upsetting of the eyelet begins. The upsetting thus is more likely to occur in that part of the shank of the eyelet that is external to the workpiece.

Figure 1 illustrates an upper work tool 10 which has a downwardly extending pick-up pin 11 that is reciprocable relative to the upper tool 10 so that it may move within its confines. The pick-up pin 11 holds an eyelet 12 that has a pre-formed head 13 and a downwardly extending hollow portion.

A bottom base tool 14 extends upwardly toward the upper work tool 10 and has a pilot pin 15 which is receivable within the hollow opening of the eyelet 12. A resilient pad 16 is mounted on the plate 17 of the apparatus for a purpose to be later described.

Figure 2 illustrates a workpiece 18 formed with a hole 19 in which it is desired to insert and fasten the eyelet 12. The upper tool 10 is formed with an annular groove 20 into which the head 13 of the eyelet 12 can be seated. The bottom tool 14 is formed with an annular groove 21 adjacent the base of the upwardly extending pin of the pilot 15, so as to form the bottom of the eyelet into outwardly curved legs. It is to be noted that the top 22 of a shoulder formed adjacent the ring 21 is initially considerably below the surface of the workpiece 18. This allows the eyelet 12 to move completely into the opening 19 until head 13 rests on workpiece 18 before the lower end is spread out to form an enlarged portion.

Figure 3 illustrates the formed eyelet which has been formed with a lower rim 23 due to the action of the upper and lower tools. It is to be noted that the elastic pad 16 which might, for example, be made of sponge rubber, has been compressed as the rim 23 is formed.

In operation, an eyelet is inserted on the pick-up pin 11 and the upper tool 10 is lowered so that the eyelet extends through the opening 19. When the pick-up pin 11 engages the pilot 15, the pin 11 is pushed upwardly into the confines of the upper tool 10. A spring 24 normally biases it downwardly. As the upper tool is moved further downwardly toward the lower tool, the lower end of the eyelet engages the curved groove 21 and the rim 23 starts to form; concurrently pressure is exerted by the upper tool 10, through head 13 on the workpiece 18. Note that the upper rim 13 is completely seated against the workpiece 18 before the lower rim 23 is started. Workpiece 18 will be pushed downwardly by the upper rim 13, which is seated in the rim 20, until the position shown in Figure 3 is attained. Rim 23 forms initially with a clearance between the lower edge of the workpiece and the lower rim 23, and does not contact the workpiece until the rim 23 is completed. The lower rim 23 is fully formed as illustrated in Figure 3 when said contact is made.

Breakage is caused in prior operations primarily by buckling of the side walls of the eyelet until they are accordion-shaped, which thus increases the diameter of the eyelet, thus breaking the workpiece. The complete clearance or penetration beyond the workpiece by the eyelet prior to any upsetting allowed by the flexible member 16 having maintained the workpiece elevated during such complete penetration of the rivet allows the rim 23 to be started substantially below the workpiece and buckling within the thickness of the workpiece thus is eliminated.

Applicant has found that about one-tenth of an inch clearance between the lower tool rim 21 and the work member 18 works satisfactorily. Without the use of the flexible material 16, the rim 23 is started prior to the engagement of the rim 13 against the workpiece 18 and there is a tendency for the portion of the eyelet within the confines of the hole 19 to spread, thus breaking the workpiece.

It is seen that this invention provides apparatus for inserting eyelets into a workpiece in a new and novel manner.

Although the invention has been described with respect to a particular embodiment thereof, it is not to be so limited as changes and modifications may be made therein which are within the full intended scope of the invention, as defined by the appended claims.

I claim:

1. An eyelet-forming apparatus comprising an upper movable work tool adapted to receive an eyelet, a lower rigidly supported base tool, said upper work tool being movable relative to said lower base tool, the resilient work-supporting means having a work-supporting upper face closely surrounding said base tool with said upper face extending in a multiplicity of oppositely and angularly related directions to a considerable distance from said base tool, said resilient means being adapted to support a workpiece on said upper face, said resilient work-supporting means having an opening closely surrounding said lower base tool, said lower base tool being provided with a dished upsetting surface positioned within said opening and below said work supporting face, and means for moving said upper work tool toward said upsetting surface to cause said lower base tool to form a head on said eyelet.

2. An eyelet-forming apparatus comprising an upper movable work tool adapted to receive an eyelet, a lower rigidly supported base tool, said upper work tool being movable relative to said lower base tool, an elastic one-piece pad having a work-supporting upper face closely surrounding said base tool with said upper face extending laterally in all directions to a considerable distance from said base tool, said pad having its lower face fixedly supported on said lower base tool and being adapted to support a workpiece on said upper face, said pad having an opening closely surrounding said lower base tool, said lower base tool being provided with a dished upsetting surface positioned within said paid opening and below said work-supporting face, and means for moving said upper work tool toward said upsetting surface to cause said lower base tool to form a head on said eyelet.

3. The method of forming a flange on a headed thin-walled tube in frangible material which is provided with an aperture therein comprising, supporting said material over a large portion of its area upon a yieldable support having a hole centrally located therethrough, inserting said tube into said aperture completely so that said head rests against a surface of said material spaced from said yieldable support, providing an upsetting surface in said central hole below the supporting face of said yieldable support, and moving said frangible material and tube assembly toward said upsetting surface by a force exerted only on said tube head against the restoring force of said yieldable support.

References Cited in the file of this patent

UNITED STATES PATENTS

| | | |
|---|---|---|
| 1,579,487 | Polinsky | Apr. 6, 1926 |
| 1,605,829 | Franz | Nov. 2, 1926 |
| 1,769,697 | Kuhn | July 1, 1930 |
| 1,952,074 | Keller | Mar. 27, 1934 |
| 2,333,966 | Weiss | Nov. 9, 1943 |